(12) United States Patent
Kim et al.

(10) Patent No.: US 9,778,734 B2
(45) Date of Patent: Oct. 3, 2017

(54) MEMORY AID METHOD USING AUDIO/VIDEO DATA

(71) Applicant: Seoul National University R&DB Foundation, Seoul (KR)

(72) Inventors: Hong Gee Kim, Gyeonggi-do (KR); Sang Sup Choi, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 366 days.

(21) Appl. No.: 14/685,804

(22) Filed: Apr. 14, 2015

(65) Prior Publication Data

US 2015/0338912 A1 Nov. 26, 2015

(30) Foreign Application Priority Data

May 23, 2014 (KR) .......................... 10-2014-0062308

(51) Int. Cl.
| | |
|---|---|
| *G11B 27/00* | (2006.01) |
| *H04N 5/93* | (2006.01) |
| *G06F 3/00* | (2006.01) |
| *G06F 17/30* | (2006.01) |
| *G06F 1/16* | (2006.01) |

(Continued)

(52) U.S. Cl.
CPC ................ *G06F 3/00* (2013.01); *G06F 1/163* (2013.01); *G06F 17/3074* (2013.01); *G06F 17/30781* (2013.01); *H04N 5/91* (2013.01); *H04N 9/8205* (2013.01); *H04N 21/4223* (2013.01); *H04N 21/4334* (2013.01); *H04N 21/44218* (2013.01); *H04N 21/8456* (2013.01)

(58) Field of Classification Search
CPC ............. G11B 27/00; H04N 5/93; H04N 9/80
USPC ......................... 386/278, 280, 282, 239, 248
See application file for complete search history.

(56) References Cited

U.S. PATENT DOCUMENTS

2014/0063237 A1* 3/2014 Stone ..................... H04N 7/181
348/143
2014/0079286 A1* 3/2014 Lee ...................... G06K 9/6202
382/103

FOREIGN PATENT DOCUMENTS

| KR | 10-2013-0030465 | 3/2013 |
| WO | WO/2012/035119 | 3/2012 |

OTHER PUBLICATIONS

Matthew L. Lee, et al.; "Providing Good Memory Cues for People with Episodic Memory Impairment"; 2007; pp. 131-138.
(Continued)

*Primary Examiner* — Daquan Zhao
(74) *Attorney, Agent, or Firm* — Blank Rome LLP

(57) ABSTRACT

Disclosed herein is a memory aid method of selecting data watched by a user, recording the selected data along with situation/behavior data upon watching, providing recorded audio/video data in response to a situation condition. The memory aid method may include receiving audio/video data from a wearable device, separating unit data including only associated parts from the audio/video data, and extracting character or feature data from the unit data. Object data and context data are generated from the character/feature data. Importance of the generated object and context data is determined with reference to a personal information DB. Audio/video data is stored depending on the importance. The method can record audio/video data recognized by a user at normal times, extract data necessary for a current situation, and provide the extracted data to the user. Accordingly, a user can accurately remember information that was watched in the past.

10 Claims, 7 Drawing Sheets

(51) Int. Cl.
*H04N 21/4223* (2011.01)
*H04N 21/433* (2011.01)
*H04N 21/442* (2011.01)
*H04N 21/845* (2011.01)
*H04N 5/91* (2006.01)
*H04N 9/82* (2006.01)
*H04N 9/80* (2006.01)

(56) References Cited

OTHER PUBLICATIONS

Steve Hodges et al.; "Sense-Cam: A Retrospective Memory Aid"; Ubicomp 2006; LNCS 4206; pp. 177-193.
Cristina Buiza et al.; "HERMES: Pervasive Computing and Cognitive Training for Ageing Well"; 2009; pp. 756-763.
Emma Berry et al.; "The Use of a Wearable Camera, SenseCam, as a Pictorial Diary to Improve Autobiographical Memory in a Patient with Limbic Encephalitis: A Preliminary Report"; Neuropsychological Rehabilitation; vol. 17; 2007; pp. 582-601.

* cited by examiner

MEMORY AID METHOD USING AUDIO/VIDEO DATA

CROSS REFERENCE TO RELATED APPLICATION

The present application claims the benefit of Korean Patent Application No. 10-2014-0062308 filed in the Korean Intellectual Property Office on May 23, 2014, the entire contents of which are incorporated herein by reference.

BACKGROUND OF THE INVENTION

1. Technical Field

The present invention relates to a memory aid method of selecting data watched by a user, recording the selected data along with situation/behavior data upon watching, extracting recorded audio/video data in response to a search instruction from a user or a situation condition, and providing the extracted audio/video data.

2. Description of the Related Art

As technology advances, modern life requires more skills and knowledge, and thus more recognition abilities are required. Furthermore, more jobs that require more recognition abilities are generated compared to the past, and a person's power of memory is overwhelmed by overflowing information in modern life. In particular, persons are being buried with enormous information poured out from the Internet, smart phones, tablet computers, TV, and radios.

One of solutions to such an information overload is a memory aid system. As if a vehicle has expanded the mobility of a human being, a memory aid system may support a human being so that a person's power of memory can be increased and a human being can further show its ability in the information overload society. Such a memory aid system needs to continue to operate along with human memory. That is, the memory aid system needs to understand the operation method of the human memory, know the strength and limits of the human memory, and instantly provide accurate information at a proper Lime.

The human being's memory may be divided into prospective memory (PM) and retrospective memory (RM). PM is defined as the ability to remember to remember (Winograd, 1988). For example, PM refers to memory that a call is to be made to a friend on Friday next week. RM refers to memory that a thing happened in the past.

Problems in PH widely appear in the aged in everyday life. For example, an aged person frequently forgets the time when pills are taken or a lunch time. The problems in PM may be easily solved. Lots of apps for smart phones that provide notification of things to do on a scheduled time are being developed [Patent Document 1].

In contrast, a memory aid technology in RM includes many problems to be solved, and related research is in progress.

For example, a system architecture used in the HERMES project has been suggested as research that suggests architecture for analyzing data collected by sensors and transmitted to a server [Non-patent Document 1]. Such a system includes cameras installed indoors and outdoors. Perceptual components responsible for a visual analysis and auditory processing extract metadata by processing audio/video input received through the cameras, and the extracted metadata is stored in the database (DB) of the system. Application data and the metadata are stored in two separate repositories. The first repository is a relation DB and used to store the application data. The second repository is a knowledge base repository and is used for tasks for verifying the validity of the metadata, inferring new knowledge, and applying a rule based on a rule engine.

For example, SenseCam of Microsoft, that is, an apparatus in which a wearable device continues to record images, is an apparatus for storing a series of images and sensor data when a user makes a living while wearing the apparatus. It was revealed that an amnesiac's memory can be helped by periodically showing images recorded by the apparatus to the amnesiac [Non-patent Document 2]. For another example, it was revealed that memories in the life of a patient having damaged memory can be improved by such a method [Non-patent Document 3]. Such research revealed that memory improvement was helped by showing continuously recorded images, but have difficulties in using the research in real time because the amount of provided video data is too much. Accordingly, there is a need to allow a user to select important images from collected video data.

Furthermore, it was revealed that anecdote memory can be improved by suggesting clues, such as persons, behaviors, subjects, and places, to a patient having damaged anecdote memory [Non-patent Document 4]. Such research results suggest a possibility that a user's anecdote memory may be improved using information, such as persons, behaviors, subjects, and places that have been extracted from continuously input audio/video data and stored.

Furthermore, a patent document suggests a 3-layered architecture for a memory aid [Patent Document 2]. A small wireless sensing device is dynamically programmed, and automatically detects important information related to the current context and environment of a wearer. The wireless sensing device determines whether specific information is important for a user using an internal rule engine and uploads the important information to a mobile application. The mobile application analyzes the important information using other information obtained by sensors and uploads a complete information set to an Internet service application. The Internet service application processes the uploaded information using another external data source and an internal processing engine and transfers the processed uploaded information to a user through a notification engine.

PRIOR ART DOCUMENT

Patent Documents (Patent Document 1) [Patent Document 1] Korean Patent Application Publication No. 10-2013-0030465 (Mar. 27, 2013)

(Patent Document 2)[Patent Document 2] PCT WO 2012/035119 A1 (Mar. 22, 2012)

Non-patent Documents (Non-patent Document 1) [Non-patent Document 1] C. Buiza, et ah, "HERMES: Pervasive Computing and Cognitive Training for Ageing Well", Distributed Computing, Artificial Intelligence, Bioinformatics, Soft Computing, and Ambient Assisted Living, pp. 756-763, 2009

(Non-patent Document 2) [Non-patent Document 2] S. Hodges, et al, "SenseCam: A Retrospective Memory Aid," ed, 2006, pp. 177-193

(Non-patient Document 3) [Non-patent Document 3] E. Berry, et al, "The use of a wearable camera, SenseCam, as a pictorial diary to improve autobiographical memory in a patient with limbic encephalitis: A preliminary report," Neuropsychological Rehabilitation, vol. 17, pp. 582-601, 2007

(Non-patent Document 4) [Non-patent Document 4] M. L. Lee and A. K. Dey, "Providing good memory cues for people with episodic memory impairment," Tempe, Ariz., USA, 2007, pp. 131-138.

SUMMARY OF THE INVENTION

Accordingly, the present invention has been made keeping in mind the above problems occurring in the prior art, and an object of the present invention is to provide a memory aid method of selecting data watched by a user, recording the selected data along with situation/behavior data upon watching, extracting recorded audio/video data in response to a search instruction from a user or a situation condition, and providing the extracted audio/video data.

In accordance with an embodiment of the present invention, a memory aid method using a system including a wearable device and a mobile terminal may include (a) receiving, by the mobile terminal, audio/video data from the wearable device, (b) separating unit data including only associated parts from the audio/video data, (c) extracting character or feature data (hereinafter called character/feature data) from the unit data, (d) generating an object from the character/feature data, generating object data, and generating context data indicative of the situation of the audio/video data, (e) determining importance of the generated object and context data with reference to a DB in which information about objects or context has been previously stored (hereinafter called a "personal information DB), and (f) storing audio/video data depending on the importance.

Furthermore, in the memory aid method in accordance with an embodiment of the present invention, the audio/video data may include one or more of video data photographed by the camera of the wearable device and voice data recorded by the microphone of the wearable device.

Furthermore, in the memory aid method in accordance with an embodiment of the present invention, (a) receiving the audio/video data further may include receiving, by the mobile terminal, sensing data including one or more of a location, time, direction, and speed measured by a sensing device of the wearable device and measured by the sensing device of the mobile terminal.

Furthermore, in the memory aid method in accordance with an embodiment of the present invention, the unit data may include image data extracted from any one of images of a face, object, and background included in the video data or a voice paragraph including at least one sentence of the voice data.

Furthermore, in the memory aid method in accordance with an embodiment of the present invention, the character data may include a character recognized in the video data using a character recognition method or a character recognized in voice data using a voice recognition method. The feature data may include a feature point extracted from an image included in the video data or the unique feature of a sound wave extracted from a sound wave included in the voice data.

Furthermore, in the memory aid method in accordance with an embodiment of the present invention, the object data may include ID information that identifies the object and property information that indicates the property of the object.

Furthermore, in the memory aid method in accordance with an embodiment of the present invention, (d) generating the object from the character/feature data may include comparing the character of the character data with ID information of an object stored in the personal information DB or comparing the feature of the feature data with the feature of an object stored in the personal information DB, recognizing the object extracted from the unit data as the object of the personal information DB if the character of the character data is matched with the ID information of the object stored in the personal information DB or the feature of the feature data is matched with the feature of the object stored in the personal information DB, and identifying the feature of the feature data as the object of the unit data if the character of the character data is not matched with the ID information of the object stored in the personal information DB or the feature of the feature data is not matched with the feature of the object stored in the personal information DB.

Furthermore, in the memory aid method in accordance with an embodiment of the present invention, the context data may include behavior data that identifies a situation and property data that indicates a property of the behavior. The behavior may have been previously sorted. A condition in which each behavior is determined may have been previously determined. (d) generating the object from the character/feature data may include determining the behavior of the context data by determining whether a combination of the character or feature data and the sensing data is matched with the condition of the previously stored behavior.

Furthermore, in the memory aid method in accordance with an embodiment of the present invention, the personal information DB may store importance of the object and the behavior, importance between objects, importance between behaviors, and importance between the behaviors and the objects. (e) determining the importance of the generated object and context data may include determining importance of the behavior of the object or context by taking into consideration all of the importance between the objects, the importance between the behaviors, and the importance between the behaviors and the objects when determining the importance of the behavior of the object or context.

Furthermore, in the memory aid method in accordance with an embodiment of the present invention, the personal information DB may store importance of the object and importance of the user the behavior and importance of another object or behavior the object or behavior. (e) determining the importance of the generated object and context data may include determining importance of the behavior of the object or context by performing a weighted sum to stored importance of the object or behavior and importance of an object or behavior having a relation with the object or behavior when determining the importance of the behavior of the object or context.

Figure 1:
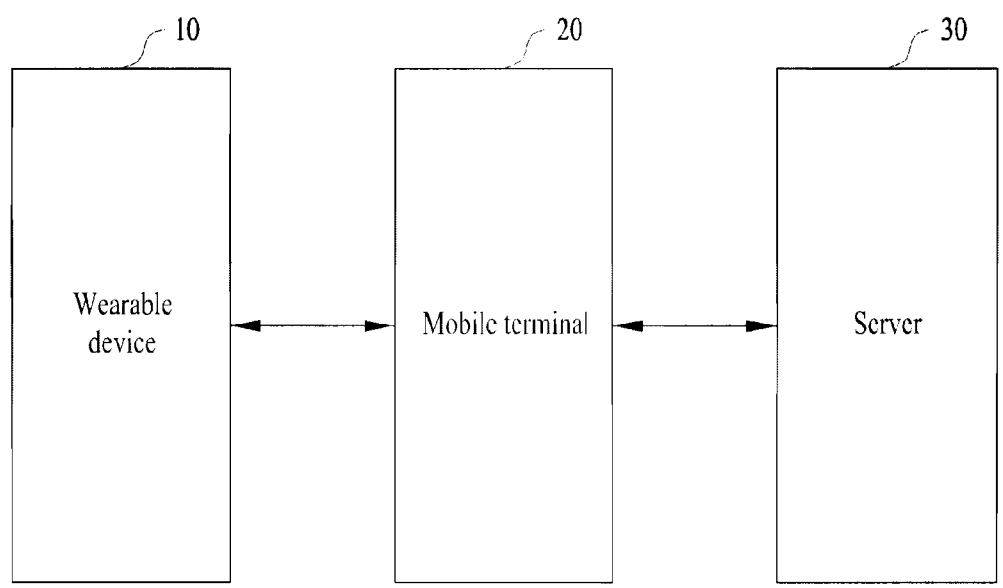
FIG. 1 is a diagram illustrating an example of the configuration of an overall system for implementing the present invention.

<Description of reference numerals of principal elements in the drawings>

| | |
|---|---|
| 10: wearable device | 20: mobile terminal |
| 30: server | 51: audio/video data |
| 50: real-time extraction data | |
| 52: context information | 53: object data |
| 60: personal information | 70: audio/video information |

DETAILED DESCRIPTION

Hereinafter, detailed contents for implementing the present invention are described with reference to the accompanying drawings.

Furthermore, the same elements are assigned the same reference numerals in describing the embodiments of the present invention, and a redundant description of the embodiments is omitted.

The configuration of an overall system for implementing a memory aid method in accordance with an embodiment of the present invention is described below with reference to FIG. 1.

As illustrated in FIG. 1, the overall system for implementing the present invention may include a wearable device 10, a mobile terminal 20, and a server 30.

Figure 2:
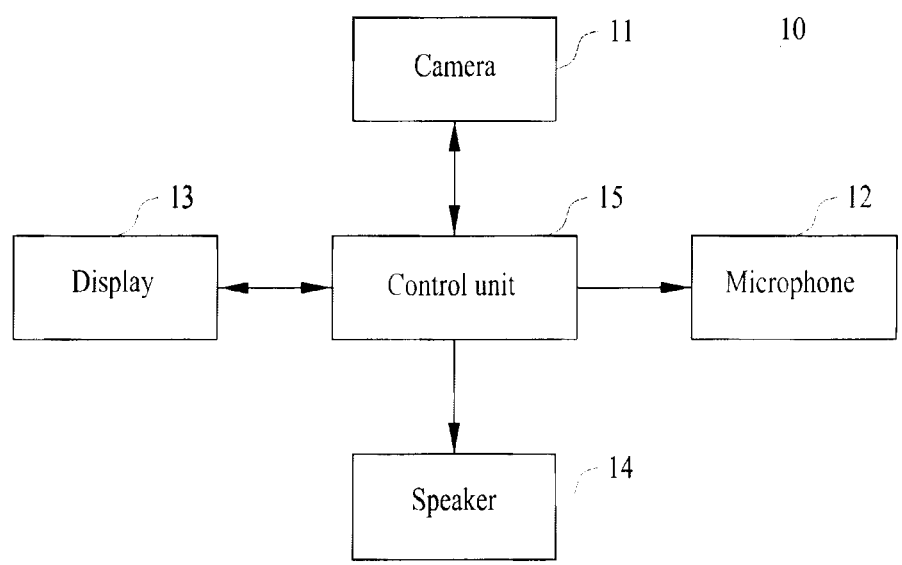
FIG. 2 is a block diagram illustrating an example of the configuration of a wearable sensing device in accordance with an embodiment of the present invention.

The wearable device 10 is a device worn on the body of a user and configured to sense information watched by the user or to provide required information to the user, and may refer to Google Glass. As illustrated in FIG. 2, The wearable device 10 may include devices capable of sensing audio/video data, such as a camera 11 and a microphone 12, and devices capable of providing a user with information aurally or visually or both, such as a display 13 and a speaker 14. The display 13 may be implemented using a method of directly radiating light to the retina of a user. The speaker 14 may be implemented using an osteophony speaker method.

Furthermore, the wearable device 10 may further include a sensing device capable of sensing the three-dimensional location or direction and speed of a user, such as a global positioning system (GPS), a gyroscope, or an acceleration sensor. Furthermore, the wearable device 10 may have a watch function for sensing current time information.

Data that is sensed by the wearable device 10 most importantly (or mainly) includes video data photographed by the camera and voice data recorded by the microphone. In particular, the camera or microphone is installed in glasses worn on the face of a user, and senses information almost similar to information that is viewed and heard by the user. Image data and voice data sensed as described above are collectively called audio/video data.

The mobile terminal 20 is a wireless communication mobile terminal capable of exchanging data over a mobile communication network, and may refer to a common smart phone or tablet PC. The mobile terminal 20 may have a program (or App) installed therein so that a specific function is performed by the installed App.

In particular, the mobile terminal 20 analyzes real-time audio/video data collected by the wearable device 10, selects required data, and stores the selected data. Furthermore, the mobile terminal 20 extracts context information or object data from recorded audio/video data and stores the extracted context information and object data together.

Program software, such as App, may be installed in the mobile terminal 20, and may perform the function for analyzing and storing data collected by the wearable device 10. It is hereinafter assumed that such a function is performed by the mobile terminal 20, for convenience of description.

Furthermore, the mobile terminal 20 may send and receive data to and from the wearable device 10 over a short-distance wireless network. In this case, the short-distance wireless network performs data communication through a protocol, such as Bluetooth.

The server 30 is a common server. The server 30 is connected to the mobile terminal 20 over a mobile communication network and through the Internet, and may send and receive data. The mobile terminal 20 is a portable device, and has a limited computing power or storage capacity. The server 30 supports additional resources to the mobile terminal 20 as described above.

Accordingly, if the mobile terminal 20 has a capacity that is unable to be processed by itself, it may send related data to the server 30 so that the server 30 performs a corresponding task. Alternatively, the mobile terminal 20 may store recent data or important data within a range of an internal storage capacity and store the remaining data in the server 30. Furthermore, the mobile terminal 20 may perform a basic search/analysis function, and the server 30 may perform the remaining functions including a function that is complicated and that requires a heavy computational load.

Importance may be assigned to each datum and each function, and functions processed by the mobile terminal 20 and the server 30 may be divided depending on the importance.

A data structure for the memory aid method in accordance with an embodiment of the present invention is described below with reference to FIG. 3.

Figure 3:
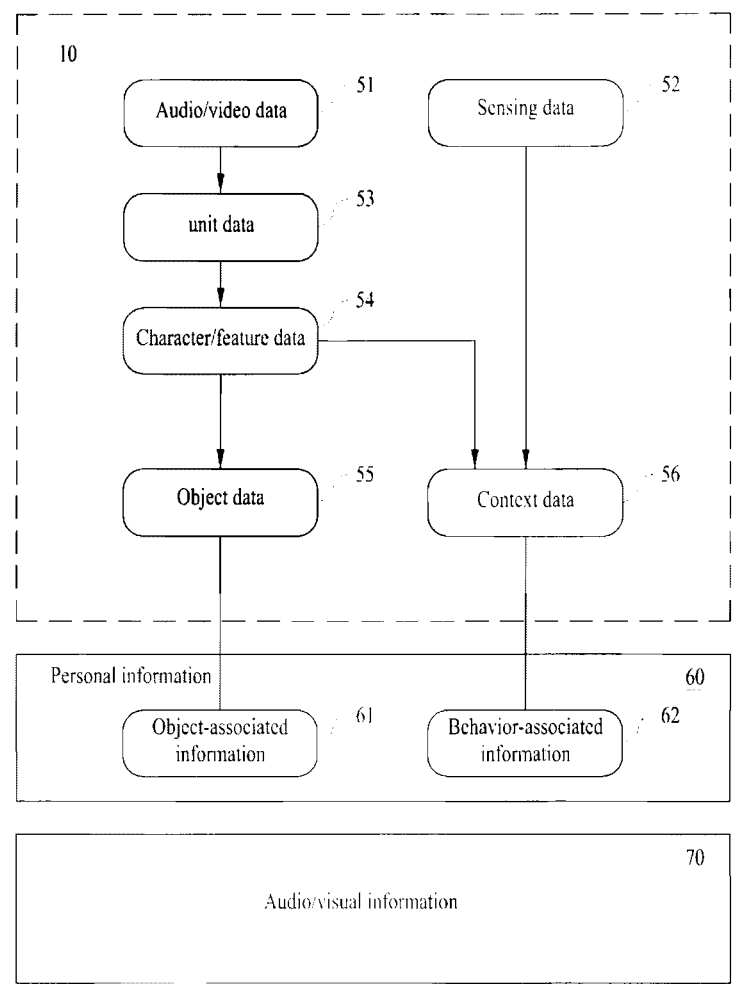
FIG. 3 is the structural diagram of data used in an embodiment of the present invention.

As illustrated in FIG. 3, data for the memory aid method in accordance with an embodiment of the present invention may include real-time generation information 50 and previously stored personal information 60.

The real-time generation information is data sensed by the wearable device 10 and information generated from the sensed data in real time, and may include audio/video data 51, sensing data 52, unit data 53, character/feature data 54, object data 55, and context data 56.

First, the audio/video data 51 is audio/video data sensed by the wearable device 10, and may include video data photographed by the camera and voice data recorded by the microphone.

The sensing data 52 refers to data sensed and input by a variety of types of sensing devices, such as a location/time, in addition to video/audio. The sensing data 52 includes objective data obtained by devices, such as the aforementioned GPS, gyroscope, and watch. The sensing data 52 may include the location measured by a GPS, the time measured by a watch, the direction measured by a gyroscope, and speed measured by an acceleration sensor.

The unit data 53 refers to data obtained by separating only associated data from the audio/video data 51. For example, the unit data 53 may include an image obtained by separating only the facial part of a person (or an object or a background) from an image or voice paragraph data separated into data of a single sentence (i.e., consecutive waveform data, that is, waveform data not including a waveform at the beginning and end) from voice data. As described above, the unit data 53 refers to data that has been separated and has a unit meaning.

Accordingly, a single sensing datum 52 may be separated into a plurality of unit data 53. The unit data 53 is a monomer for analysis. That is, information, such as an object or context, is extracted by analyzing the unit data 53 separated from the audio/video data 51.

Furthermore, a background image or the entire image of the audio/video data 51 may be separated from a single unit datum 53. In particular, in order to extract context information, a comparison may be performed on the background or the entire image.

The character/feature data 54 is data indicative of the character or feature extracted from the unit data 53.

More specifically, character data may be extracted from the unit data 53 using a common character recognition or voice recognition method. An image of video data is analyzed, and letters, numbers, and symbols included in the image are recognized and converted in a text form. Such a function may be performed using a common character recognition method, such as OCR. Furthermore, voice from voice data is converted in text. Such a function may be performed using a common voice recognition (or speech-to-text conversion) method.

Furthermore, feature data may be extracted from the unit data 53 using a common image identification (face/object identification) or voice identification method. The feature data is data for identifying a target of video or voice. That is, the feature data refers to a feature extracted from an image or a sound wave.

If the unit data 53 is video data, a feature (or feature point) is extracted from the face of a person or an image of an object and is compared with another stored image and feature (or feature point) in order to determine whether they are similar or the same. Whether a corresponding facial image corresponds to which person and a corresponding image corresponds to which animal or which object may be determined using such a feature an image. Furthermore, whether corresponding place corresponds to which place may be determined by analyzing the feature of the unit data 53 of the entire background image.

Furthermore, if the unit data 53 is voice data, in order to identify that a corresponding voice corresponds to the voice of which person, a feature unique to a sound wave may be extracted and compared with the extracted unique feature with the feature of a previously stored voice in order to determine whether they are similar or the same. Whether a corresponding voice corresponds to the voice of which person and whether a corresponding voice is the sound of a specific animal or the sound of a vehicle may be determined using such a feature of a voice.

The object data 55 refers to data (e.g., ID information) that identifies the object of the unit data 53 (or audio/video data) and the property data (or property) of an identified object that have been obtained by searching previously stored object information (or personal information) for the character/feature data 54 extracted from the unit data 53.

That is, the unit data 53 is separated from the audio/video data 51. A character/feature is extracted from the separated unit data 53. An object is identified by comparing the extracted character/feature with the character/feature of a previously stored object. Accordingly, the identified object is an object that appears in the audio/video data 51.

An object extracted from the audio/video data 51 may be a human being, an animal, furniture, or a thing. If the audio/video data 51 is video data, the face of a person may be extracted from a video. In this case, an object is a person (or the face of a person). Likewise, an animal, a building, furniture, or a thing may be extracted. A target extracted as described above is also called an object.

The number of objects extracted from the audio/video data 51 may be one or more. For example, in the case of a situation in which a conversation with three employees is performed, the objects of at least three persons may be extracted. Object data is generated for each of the three extracted objects. In this case, three unit data 53 is separated from the audio/video data 51, the character/feature data 54 is extracted from each of the three unit data 53, and each of the persons is identified. Finally, the three persons are identified.

In this case, if the extracted object image is matched with a previously stored facial image, whether the object is which person can be checked (e.g., ID information, such as a name, can be checked). That is, if the extracted object image is matched with a previously stored facial image, whether the extracted object is which person can be identified. Furthermore, various properties of the identified object can be checked by checking the property of stored object information.

That is, the ID information of the object data 55 is information for identifying an object, and may include unique identification information, such as an ID, a name, or a resident registration number. Furthermore, the property of the object data 55 is information about the property of an identified object, and may include an age, a sex, an address, a job, hobbies, and a relation with a user. in this case, the property information is obtained from the property of a previously stored object.

When previously stored object information is searched for, both an extracted character and an extracted feature may be used. A feature comparison may be performed based on a facial image, or a name may be extracted from characters and a comparison may be performed on the letters of the name.

If the extracted object image is not matched wilt a previously stored facial image, it is unable to identify that the extracted object is which person. In this case, an extracted feature point (or feature) may be used as ID information. That is, if an extracted object (or face image) is not present in a stored object (or face image), the object is identified based on the extracted feature. For example, if the feature of an object extracted from video data photographed at 2 o'clock yesterday is similar to the feature of an object extracted from video data photographed at 7 o'clock today, it may be seen that a user wants to meet a person with which the user has met at 2 o'clock yesterday again at 7 o'clock today.

Furthermore, if the audio/video data 51 or the unit data 53 is voice data, a feature may be extracted by analyzing the waveform of the voice. Furthermore, the object of the voice may be checked by comparing the characteristic of a sound wave with the waveform characteristic of a stored voice. This is the same as the aforementioned video data method.

The feature of a person has been illustrated as being extracted. The target of an object may be determined by analyzing an image of an animal or the feature (or feature point) of a sound.

The context data 56 refers to behavior (or situation) data (behavior information) identified by checking whether a combination of the character/feature data 54, extracted from the unit data 53, and the sensing data 52 is matched with a previously stored rule or condition and to the property data (or property) of the identified behavior.

In particular, in order to identify a behavior (or situation), the sensing data 52 sensed by various sensing devices is also used in addition to the extracted character/featured data 54.

A situation (or behavior) may be previously categorized, conditioned, and divided. That is, a plurality of behaviors (or situations) may be sorted, and a condition (or rule) determined to be a corresponding behavior is previously prepared.

For example, if a voice comment, such as "Hello. This is OOO.", is detected in the voice data of the audio/video data 51, it is classified as the category of a behavior "greeting." If the background screen of video data of the audio/video data 51 is matched with an image of a conference room, it is classified as the category of a behavior "conference."

Furthermore, the context data 56 may be extracted by analyzing the sensing data 52. For example, a specific place may be checked from a location, that is, one of the sensing data 52, and a specific behavior (or situation) using the specific place as a condition may be recognized. Furthermore, if a person identified in the unit data 53 is a "doctor", it may be classified as a behavior (situation) "treatment" or a "hospital".

The identified behavior of the context data 56 may have a property indicative of the features of the behavior. For example, the identified behavior of the context data 56 may have properties, such as the time when the behavior occurred, persons who participated in the behavior, and the place where the behavior occurred. Properties previously stored with respect to a behavior may be used as such properties, and properties may be newly extracted from the sensing data 52 or the character/feature data 54.

Furthermore, the object data 55 and the context data 56 may have a relation. A relation is automatically set up between the object data 55 and context data 56, generated from a single audio/video datum 51, as the same audio/video data. Furthermore, each of the object data 55 and the context data 56 may have a relation with the data of personal information to be described below.

The personal information 60 is described below.

The personal information 60 is previously stored data and is data including importance determined to be important by a user. The personal information 60 is chiefly divided into the data of an object (hereinafter called "object-associated information") 61 and the data of a behavior (hereinafter called "behavior-associated information") 62.

The object-associated information 61 is the data and property of an object, and includes data regarding a relation with a user. For example, the object-associated information 61 may include the name of an object, such as "Hong Gil-dong", a job, such as "student", and relation data with a user, such as a "family/friend/colleague/customer." The object-associated information 61 may have personal information about an object, such as a name, job, and age, as the property of the object.

Furthermore, the object-associated information 61 may be relation property information, and includes importance. The importance indicates a criterion for the degree of importance of a user.

The behavior-associated information 62 may include the data of a behavior (or situation) that has been categorized and classified as described above and relation data with a user. The behavior-associated information 62 also includes importance like the object-associated information 61. For example, if a behavior is "baseball", the behavior-associated information 62 includes data regarding the hobby or interest of a user and regarding importance thereof.

A relation according to importance may be set up between the object-associated information 61 and the behavior-associated information 62. An example in which an object A is a son, an object B has a relation established with the object A as a friend of the object A, importance for a user has been set only in the object A, and importance for the user has not been set in the object B is described below. In this case, the importance of the user for the object B may be inferred by taking into consideration the importance between the user and the object A and the importance between the objects A and B.

Furthermore, if a relation has been established between a behavior "baseball" and an object "gloves", there is a good possibility that a user may also consider "gloves" to be important if he or she considers "baseball" to be important. This may be derived from a relation including importance.

That is, the personal information 60 also stores the importance of the object or behavior with respect to a user and stores the importance of the object or behavior with respect to another object or behavior. The former importance is importance that appears in a relation with a user, and the latter importance is importance that appears in a relation with another object or behavior.

The importance of an extracted (or generated) object or behavior may be obtained as the weighted sum of the stored importance of the object or behavior and the importance of an object or behavior (hereinafter called an "associated object or behavior") associated with the object or behavior.

In summary, after the context information 52 or the object data 53 is extracted from the audio/video data 51, the context information 52 or the object data 53 may be searched for in the personal information 60, and importance may be extracted from the retrieved object-associated information 61 or behavior-associated information 62. The entire importance of the audio/video data 51 or real-time extraction data 50 may be set by combining and determining pieces of importance of objects or pieces of importance of behaviors.

Audio/visual data and audio/video information 70, including unit data, character/feature data, and object/context data generated from the audio/video data, are stored. That is, the audio/video information 70 refers to data including the object/context data generated from the audio/video data 51 along with the audio/video data.

A memory aid method in accordance with a first embodiment of the present invention is described below with reference to FIG. 4.

Figure 4:
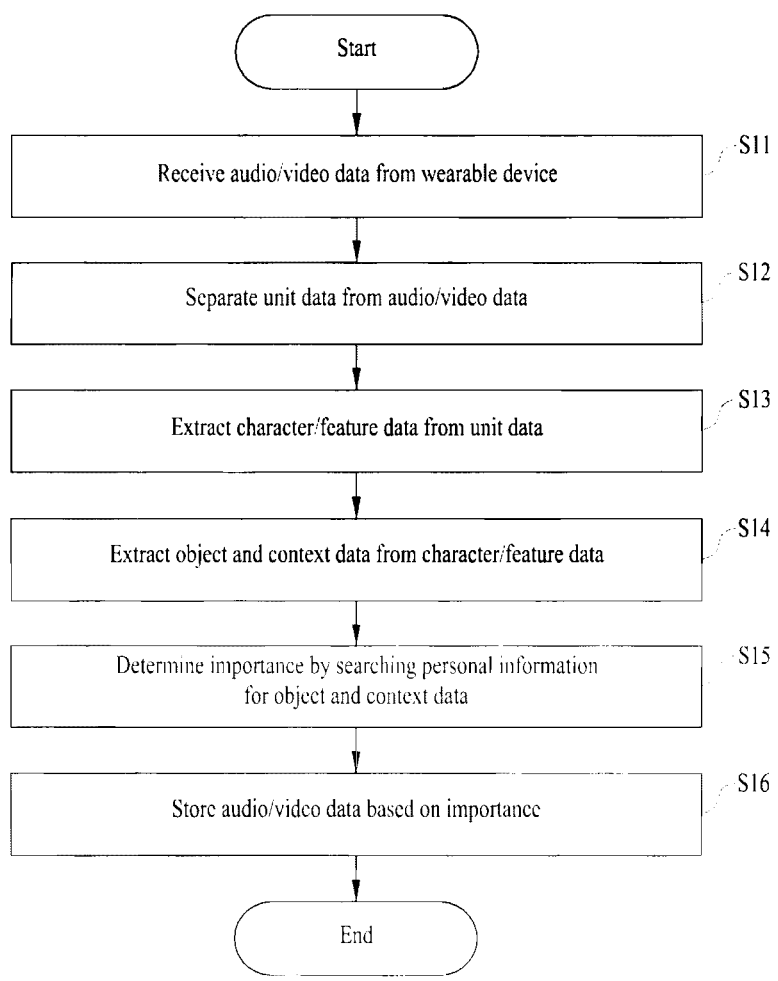
FIG. 4 is a flowchart illustrating a memory aid method in accordance with a first embodiment of the present invention.

As illustrated in FIG. 4, the memory aid method in accordance with the first embodiment of the present invention may include (a) receiving audio/video data from the wearable device 10 at step S11, (b) separating unit data from the audio/video data at step S12, (c) extracting character/feature data from the unit data at step S13, (d) extracting object and context data from the character/feature data at step S14, (e) determining importance by searching personal information for the object and context data at step S15, and (f) storing the audio/video data based on the importance at step S16.

First, the mobile terminal 20 receives the sensing data (audio/video data) 51 from the wearable device 10 at step S11. More specifically, the mobile terminal 20 receives video data photographed by the camera of the wearable device 10 and voice data recorded by the microphone of the wearable device 10.

In this case, the mobile terminal 20 may receive the sensing data 52, such as the time or location, from the wearable device 10 or may directly receive the sensing data 52 through an embedded watch function or a GPS.

The mobile terminal 20 separates the unit data 53 that has been associated in unit from the received audio/video data 51 at step S12. That is, the mobile terminal 20 separates a character or feature into a unit of a video or voice that can be extracted.

The mobile terminal 20 extracts a character or feature from the separated unit data 53 at step S13. That is, the mobile terminal 20 may convert letters, numbers, and symbols, appearing in an image of the video data, in a text form and convert a voice included in the voice data in a text form. Furthermore, the mobile terminal 20 extracts feature data using an image identification method or voice identification method.

Furthermore, the mobile terminal 20 identifies object or context data by searching for previously stored object or context data using the extracted character and feature at step S14. That is, if a DB (or personal information) in which the object or context data has been stored is searched for based on the character and feature, the mobile terminal 20 identifies the object of the unit data 53 or the context of the audio/video data 51 as a retrieved object or context.

The mobile terminal 20 determines the importance of the audio/video data 51 by searching the personal information 60 for the importance of the retrieved object or context at step S15. If the importance is higher than a predetermined threshold, the mobile terminal 20 stores the current audio/video data 51 at step S16.

A plurality of objects may be identified or a plurality of pieces of context may be identified with respect to a single audio/video datum 51. In this case, total importance may be computed by weighting pieces of importance of the objects or context, or the highest importance may be set as total importance. Furthermore, the total importance may be compared with a threshold.

Furthermore, if the face of a new person is recognized or in the case of the context of a behavior "greeting", importance may be set high. Accordingly, audio/video data in the case of greeting with a new person may be unconditionally stored.

In particular, in this case, when the audio/video data 51 is stored, information about an extracted object and context is also stored. In this case, audio/video data, and unit data, character/feature data, and object data, and context data related to the audio/video data are also included in the audio/video information 70.

The aforementioned method has been illustrated as being performed by the mobile terminal 20, but tasks performed by the mobile terminal 20 may be shared with the server 30 as described above. That is, the mobile terminal 20 may send all the data, received from the wearable device 10, to the server 30, may receive only the processing results of the server 30, and may store the received processing results as the audio/video data 51. In some embodiments, the mobile terminal 20 may perform all the tasks. Furthermore, some of tasks may be performed by the mobile terminal 20, and some of the tasks may be performed by the server 30.

For example, when a user wears the wearable device 10 and starts to make a living, the mobile terminal 20 starts to analyze video/audio input information received through the wearable device 10. Unnecessary input data (e.g., input data having low importance) is discarded depending on importance.

Furthermore, at 10 a.m., a user meets a new customer, Hong Gil-dong, at an office, exchanges greeting with the new customer, exchanges business cards, and reads information within the business card. In this case, the mobile terminal 20 recognizes that the face of Hong Gil-dong is not an existing stored face, but is a new face. That is, the mobile terminal 20 has attempted to extract the feature of the face of Hong Gil-dung, but failed to extract the feature because there is not face matched with the face of Hong Gil-dong. Accordingly, the mobile terminal 20 recognizes the face of Hong Gil-dong as a new face and stores ID information as a feature. Furthermore, the mobile terminal 20 reads and generates the object data of the business card from information about an image of the business card. The object data of the face and the object data of the business card have a relation as the same audio/video data object. In this case, the user may artificially set that the relation is the business card of Hong Gil-dong and is the relation of a property. That is, the face of Hong Gil-dong and the name "Hong Gil-dong" may be combined and stored along with information (e.g., Hong Gil-dong, the office, at 10 a.m., 00 month 00 day, 0000 year, introduction).

A memory aid method in accordance with a second embodiment of the present invention is described in detail below with reference to FIG. 5.

Figure 5:
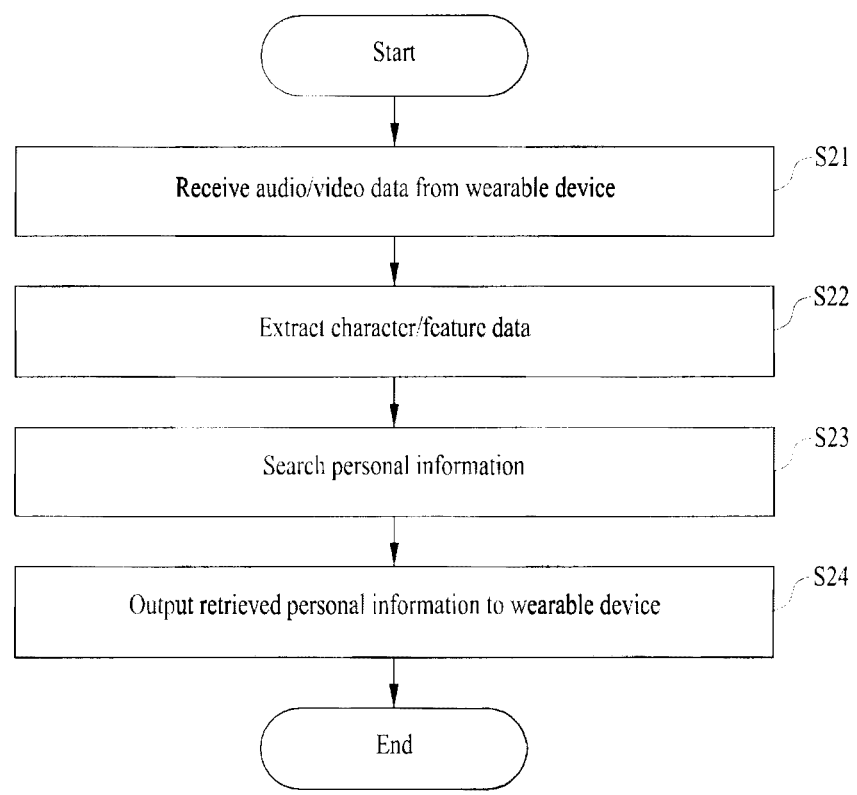
FIG. 5 is a flowchart illustrating a memory aid method in accordance with a second embodiment of the present invention.

As illustrated in FIG. 5, the memory aid method in accordance with the second embodiment of the present invention may include (a) receiving audio/video data from the wearable device 10 at step S21, (b) extracting character/feature data at step S22, (c) searching personal information at step S23, and (d) outputting the retrieved personal information to the wearable device 10 at step S24.

As in the first embodiment, the mobile terminal 20 receives the audio/video data 51 from the wearable device 10 at step 521 and extracts the character/feature data from the received audio/video data 51 at step S22. Furthermore, the mobile terminal 20 searches the personal information 60 for the extracted character/feature data at step S23 and sends retrieved personal information to the wearable device 10 at step S24.

That is, in the first embodiment, object/context matched by extracting character/feature data has been illustrated as being searched in the personal information 60, and object/context data has been illustrated as being generated. In contrast, in the second embodiment, separate object/context data is not generated, and matched data is searched for in stored information and transmitted to the wearable device 10.

In the above example, a user has a lunch meeting with a customer at the customer's office at 12 p.m. and meets the customer at the restaurant. In this case, the wearable device 10 separates a facial object from an image of the customer and recognizes that the face has the same feature as an image (or face) of the stored personal information 60 named "Lim Kkeokjeong." The wearable device 10 sends personal property information about "Lim Kkeokjeong" to the wearable device 10.

A memory aid method in accordance with a third embodiment of the present invention is described below in detail with reference to FIG. 6.

Figure 6:
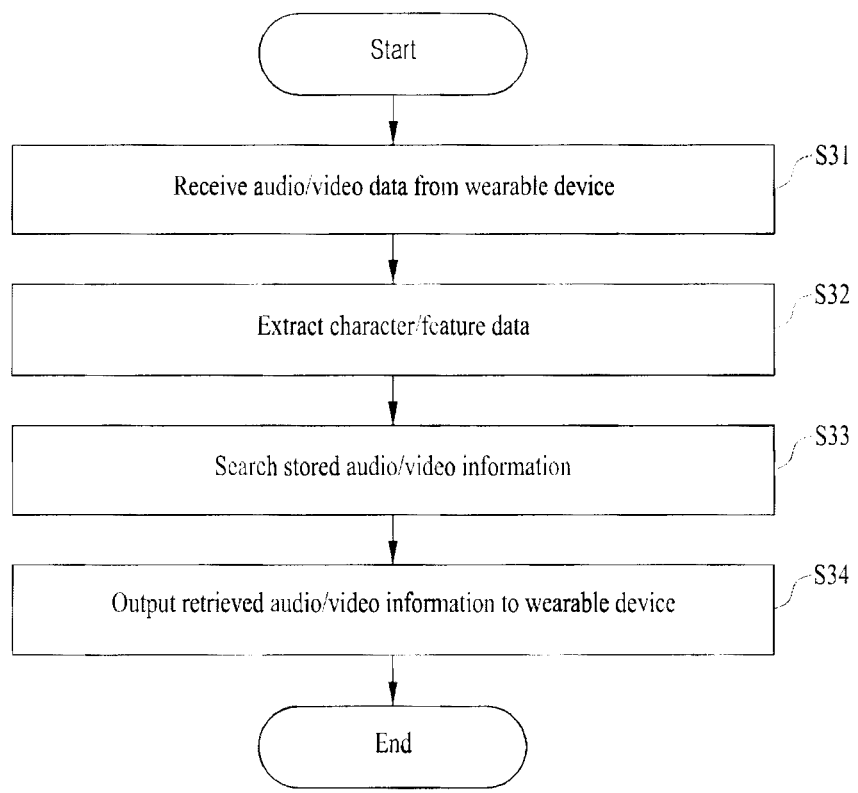
FIG. 6 is a flowchart illustrating a memory aid method in accordance with a third embodiment of the present invention.

As illustrated in FIG. 6, the memory aid method in accordance with the third embodiment of the present invention may include (a) receiving audio/video data from the wearable device 10 at step S31, (h) extracting character/feature data at step S32, (c) searching stored audio/video information at step S33, and (d) outputting the retrieved audio/video information to the wearable device 10 at step S34.

As in the second embodiment, the mobile terminal 20 receives the audio/video data 51 from the wearable device 10 at step S31 and extracts character/feature data from the received audio/video data 51 at step S30. Furthermore, the mobile terminal 20 searches the audio/video information 70 for the extracted character/feature data at step S33 and sends retrieved audio/video information to the wearable device 10 at step S34.

That is, in the second embodiment, an object/context matched by extracting character/feature data has been illustrated as being searched for in the personal information 60. In contrast, in the third embodiment, matched data may be searched for in the audio/video information 70 that has been previously generated and stored and transmitted to the wearable device 10.

In the above example, at 10 p.m., a user tries to remember the name of a customer who has been met in the morning, but is unable to remember the name. In this case, the wearable device 10 separates a facial object from an image of the customer and searches the audio/video information 70 for the facial object. Furthermore, the wearable device 10 recognizes that the face has the same feature as the face of the object stored at 10 a.m. Furthermore, the fact that the user met the customer at 10 a.m. and business card information at that time are transmitted to the wearable device 10.

A memory aid method in accordance with a fourth embodiment of the present Invention is described below in detail with reference to FIG. 7.

Figure 7:
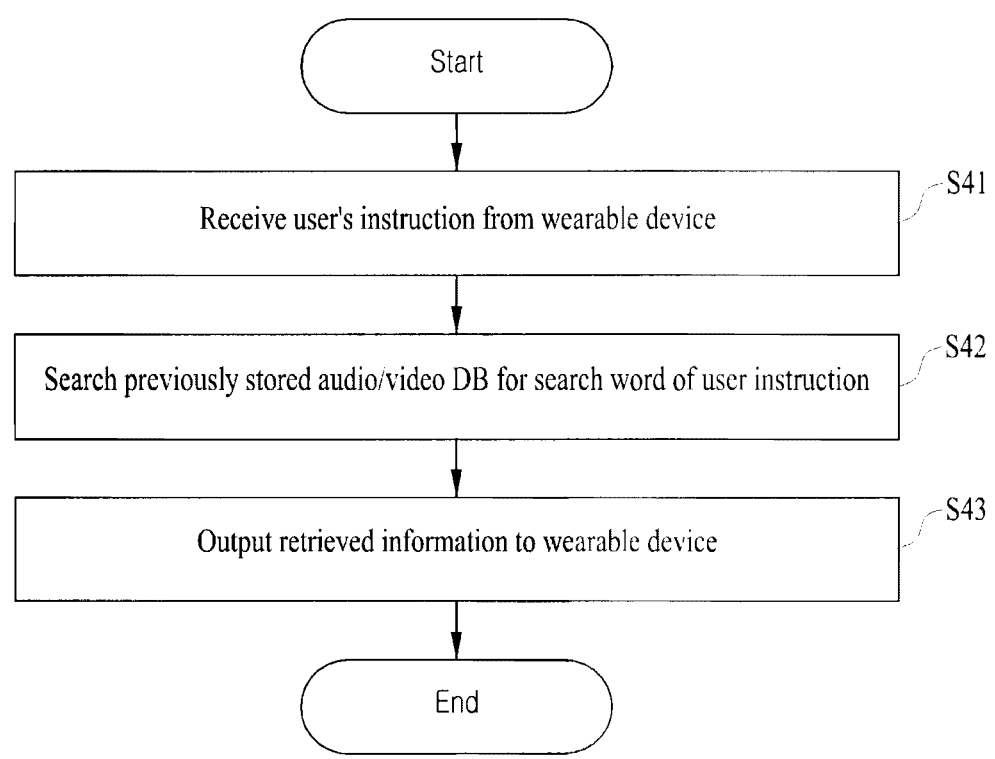
FIG. 7 is a flowchart illustrating a memory aid method in accordance with a fourth embodiment of the present invention.

As illustrated in FIG. 7, the memory aid method in accordance with the fourth embodiment of the present invention may include (a) receiving a user's instruction from the wearable device 10 at step S41, (b) searching previously stored audio/video DB for the search word of the user instruction at step S42, and (c) outputting retrieved information to the wearable device 10 at step S43.

When a user's instruction is received from the wearable device 10 at step S41, a voice instruction is analyzed. The stored audio/video information 70 is searched based on the instruction at step S42. Retrieved information is transmitted to the wearable device 10 at step S43.

In the above example, at 10 p.m., a user tries to remember the name of a customer who has been met in the morning, but is unable to remember the name. Accordingly, the user speaks that "what is the name of the customer who was met in the morning." The mobile terminal 20 extracts "Hong Gil-dong" using search words "this morning" and a "customer name" and sends the extracted name to the wearable device 10.

As described above, in accordance with the memory aid methods in accordance with the embodiments of the present invention, there is an advantage in that a user can accurately remember information watched by the user even after a lapse of a long time because audio/video data recognized by the user at normal times is recorded and data necessary for a current task or situation is extracted and provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A memory aid method using a system comprising a wearable device and a mobile terminal, comprising:
    (a) receiving, by the mobile terminal, audio/video data from the wearable device;
    (b) separating unit data comprising only associated parts from the audio/video data;
    (c) extracting character or feature data (hereinafter called character/feature data) from the unit data;
    (d) generating an object from the character/feature data, generating object data, and generating context data indicative of a situation of the audio/video data;
    (e) determining importance of the generated object and context data with reference to a personal information database (hereinafter called a "personal information DB") in which information about objects or context has been previously stored; and
    (f) storing audio/video data depending on the importance.

2. The memory aid method of claim 1, wherein the audio/video data comprises one or more of video data photographed by a camera of the wearable device and voice data recorded by a microphone of the wearable device.

3. The memory aid method of claim 2, wherein (a) receiving the audio/video data further comprises receiving, by the mobile terminal, sensing data comprising one or more of a location, time, direction, and speed measured by a sensing device of the wearable device and measured by a sensing device of the mobile terminal.

4. The memory aid method of claim 3, wherein:
    the context data comprises behavior data that identifies a situation and property data that indicates a property of the behavior,
    the behavior has been previously sorted,
    a condition in which each behavior is determined has been previously determined, and
    (d) generating the object from the character/feature data comprises determining a behavior of the context data by determining whether a combination of the character or feature data and the sensing data is matched with a condition of the previously stored behavior.

5. The memory aid method of claim 4, wherein:
    the personal information, DB stores importance of the object and the behavior, importance between objects, importance between behaviors, and importance between the behaviors and the objects, and
    (e) determining the importance of the generated object and context data comprises determining importance of a behavior of the object or context by taking into consideration all of the importance between the objects, the importance between the behaviors, and the importance between the behaviors and the objects when determining the importance of the behavior of the object or context.

6. The memory aid method of claim 2, wherein the unit data comprises image data extracted from any one of images of a face, object, and background included in the video data or a voice paragraph comprising at least one sentence of the voice data.

7. The memory aid method of claim 2, wherein:
    the character data comprises a character recognized in the video data using a character recognition method or a character recognized in voice data using a voice recognition method, and
    the feature data comprises a feature point extracted from an image included in the video data or a unique feature of a sound wave extracted from a sound wave included in the voice data.

8. The memory aid method of claim 2, wherein the object data comprises ID information that identifies the object and property information that indicates a property of the object.

9. The memory aid method of claim 8, wherein (d) generating the object from the character/feature data comprises:
    comparing a character of the character data with ID information of an object stored in the personal information DB or comparing a feature of the feature data with a feature of an object stored in the personal information DB, recognizing the object extracted from the unit data as the object of the personal information DB if the character of the character data is matched with the ID information of the object stored in the personal information DB or the feature of the feature data is matched with the feature of the object stored in the personal information DB, and identifying the feature of the feature data as the object of the unit data if the character of the character data is not matched with the ID information of the object stored in the personal information DB or the feature of the feature data is not matched with the feature of the object stored in the personal information DB.

10. The memory aid method of claim 2, wherein:

the personal information DB stores importance of the object and importance of a user of the behavior and importance of another object or behavior of the object or behavior, and (e) determining the importance of the generated object and context data comprises determining importance of a behavior of the object or context by performing a weighted sum to stored importance of the object or behavior and importance of an object or behavior having a relation with the object or behavior when determining the importance of the behavior of the object or context.

* * * * *